3,252,856
ALKYLHALODIPHENYL OXIDE SULFONATES
AS MICROBIOCIDES
Alfred F. Steinhauer and Joseph C. Valenta, Midland, Mich., assignors to The Dow Chemical Company, Midland, Mich., a corporation of Delaware
No Drawing. Original application Sept. 28, 1959, Ser. No. 842,583, now Patent No. 3,110,683, dated Nov. 12, 1963. Divided and this application June 20, 1963, Ser. No. 289,392
8 Claims. (Cl. 167—30)

This application is a division of copending application Serial No. 842,583, filed September 28, 1959, now issued as Patent No. 3,110,683 which was a continuation-in-part of applications, Serial Nos. 744,008, filed June 23, 1958, now abandoned, and 816,061, filed May 27, 1959, now abandoned.

This invention relates to alkylated halogenated sulfonated diphenyl oxides; i.e. to compounds having diphenyl oxide as a nucleus to which are attached a long-chain alkyl radical, one or two halogens, and one or two sulfonic acid radicals and their use as anti-microbial agents. These compounds are those having the generic formula

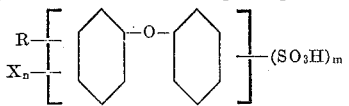

wherein R represents an alkyl radical containing 12 to 22 carbon atoms; X represents a halogen of atomic number 17 to 53; i.e., chlorine, bromine or iodine; and, $m$ and $n$ are integers from 1 to 2; and salts thereof.

The soluble compounds of the invention are highly surface-active. Thus, the lithium, sodium, potassium, ammonium and most amine salts are readily soluble in water and are useful as detergents, wetting agents, emulsifying and dispersing agents and the like as well as antimicrobial agents. Many are soluble in petroleum oils and distillates and in various organic fluids. The polyvalent metal salts are substantially insoluble in water but are generally soluble in various organic solvents, including petroleum oils. Solutions in the latter are particularly useful as corrosion inhibitors for ferrous metals as well as being effective oil-soluble surfactants. An especially valuable property of the compounds is their ability to inhibit the growth of many bacteria and fungi. Moreover, the compounds have a strong affinity for surfaces of many materials; hence their inhibitory influence is often long retained by objects that have been contacted with the compounds.

The compounds of the invention may be prepared in a variety of ways as set forth in our copending application Serial No. 842,583, filed September 28, 1959 now issued as Patent No. 3,110,683. Thus, diphenyl oxide may be alkylated, halogenated and sulfonated in any desired sequence to produce the sulfonic acids. The latter may then be converted to any desired salt thereof by reaction with the appropriate base or salt. Alternatively, either or both of the benzene rings of the diphenyl oxide nucleus may be appropriately alkylated and/or halogenated before being condensed to form the diphenyl oxide nucleus.

It is readily apparent that in the synthesis of the compounds of the invention one may, and usually does, obtain a mixture of cogeneric products wherein the number of alkyl, halogen or sulfonate substituents on the diphenyl oxide nucleus has an average value other than the whole numbers 1 or 2. Thus, a typical product may contain an average of 1.1 alkyl groups, 1.8 halogen atoms and 1.4 sulfonate groups. Such mixtures are in general fully as useful as the pure compounds and are sometimes actually preferred to the latter.

It is likewise apparent that one can make any desired salt from the sulfonic acids of the invention. The acids may be neutralized directly with ammonia, an amine or a soluble metal hydroxide or carbonate. Alternatively, one may convert one salt to another. Thus, to make the magnesium or iron salt, for instance, one may add an aqueous solution of a soluble iron or magnesium salt, such as the chloride or nitrate, to an aqueous solution of an alkali metal or ammonium salt of the sulfonic acid. The magnesium and iron salts of the sulfonic acid, being substantially insoluble in water, are thus precipitated.

The compounds of the invention have been tested and found to exert potent bacteriostatic and fungistatic effect on many common harmful bacteria and fungi. Moreover, it has been found that when many articles, especially fabrics, are washed in a solution containing the active alkylhalodiphenyl oxide sulfonate, a marked residual bacteriostatic and fungistatic effect is observed; i.e., not only is the growth of the microbes then on the washed object substantially inhibited but the inhibitory effect persists for days thereafter. While these effects are strongest when alkylhalodiphenyl oxide sulfonates are used as the sole detergent, it is also observed when they constitute only a small percentage of the active detergent, the major portion thereof being any conventional detergent having no unusual antimicrobial property.

EXAMPLE 1

5 ml. of a 24-hour culture of *Micrococcus pyogenes* var. *aureus* (strain ATCC 209), also known as *Staphylococcus aureus*, in peptone broth was mixed with 50 ml. of a molten nutrient agar at 50° C. 5 ml. of this mixture was pipetted onto the surface of Petri dishes containing solidified nutrient agar and the Petri dishes were set aside to let the agar harden. Fabrics washed with detergent composition and dried were then placed on top of the agar in the seeded Petri dishes. The plates were incubated for 24 hours at 37° C. The fabric was thereafter removed from the agar surface and the latter examined for evidence of growth of bacteria. The area covered by the cloth washed with sodium dodecylchlorodiphenyl oxide sulfonate as well as an area around the perimeter of the cloth of ½ millimeter width was found to be substantially free from the growth of the bacterial organism. The areas under the cloth washed with dodecylbenzene sulfonate or sodium lauryl sulfate showed the growth of numerous colonies of the bacterial organism.

In tests similar to that above, fabrics that had been dry cleaned were tested for desidual antimicrobial activity. Results are summarized in Table I with perchloroethylene containing as the sole surfactant about 1 to 3% by weight of one of the surfactants of the invention.

TABLE I

| Detergent | Fabric | Bacterial Growth Under Sample | Zone of Inhibition, mm. |
|---|---|---|---|
| Na Dodecylchlorodiphenyl Oxide Sulfonate. | Rayon | None | 1.0-1.5 |
|  | Wool | do | 1.0-1.5 |
| Diethanolammonium Dodecylchlorodiphenyl Oxide Sulfonate. | Rayon | do | 1.5-2.0 |
|  | Wool | do | 1.2-2.5 |
| None | Rayon | Moderate | None |
|  | Wool | Heavy | None |

It has been noted that the residual bacteriostatic and fungistatic properties of articles washed or otherwise contacted with the compounds of the invention is considerably enhanced if polyvalent metal ions are present. This is thought to be due to the precipitation on the treated article of the insoluble or difficultly soluble polyvalent metal salt of the alkylhalodiphenyl oxide sulfonic acid. Ordinary domestic water supplies contain sufficient hardness to produce this effect although additional soluble salts, such as calcium or magnesium chloride, sulfate, carbonate or the like may be added to the treating solution if desired. Among the salts that have been found especially effective for this purpose are those of calcium, zinc, magnesium, copper, mercury and iron. Other suitable salts include those of aluminum, manganese, barium, lead, silver, cadmium, and, in general, any metal having a valence of up to three. Such salts of any of the alkylhalodiphenyl oxide sulfonic acids of the invention are apparently effective for the purpose.

In a series of antimicrobial tests of various compounds of this invention the compound to be tested was dissolved in sterile distilled water and portions of this solution were mixed into A.O.A.C. broth to produce concentrations therein of 0, 2.5, 5, 7.5, 10, 25 and 50 parts per million, by weight. Tubes of these broths were then inoculated with a 24-hour culture of *Staphylococcus aureus* and incubated at 37° C. for 48 hours. They were then read for growth or no growth. Some typical results of such tests are shown in Table II.

In Table II two numbers are shown under the heading "Inhibitory Concentration." The first is the highest tested concentration at which growth of the bacteria was observed while the second is the lowest tested concentration which prevented growth.

TABLE II

*Inhibition of growth of Staphylococcus aureus*

| Compound | Inhibitory Concentration, p.p.m. |
|---|---|
| Na Dodecylchlorodiphenyl Oxide Sulfonate | 2.5-5 |
| Zn Dodecylchlorodiphenyl Oxide Sulfonate | 10-25 |
| Hg Dodecylchlorodiphenyl Oxide Sulfonate | 2.5-5 |
| Li Dodecylchlorodiphenyl Oxide Sulfonate | 2.5-5 |
| Cu Dodecylchlorodiphenyl Oxide Sulfonate | 7.5-10 |
| Mg Dodecylchlorodiphenyl Oxide Sulfonate | 2.5-5 |
| Ca Dodecylchlorodiphenyl Oxode Sulfonate | 5-7.5 |
| N,N-bis(2-hydroxyethyl) Ammonium Dodecylchlorodiphenyl Oxide Sulfonate | 2.5-5 |
| Na Dodecylchlorodiphenyl Oxide Disulfonate | 25-50 |
| Na Dodecyldichlorodiphenyl Oxide Sulfonate | 2.5-5 |
| Na Dodecylbromodiphenyl Oxide Sulfonate | 7.5-10 |
| Na Dodecylbromodiphenyl Oxide Disulfonate | 25-50 |
| Na Pentadecylchlorodiphenyl Oxide Disulfonate | 25-50 |
| Na Pentadecylchlorodiphenyl Oxide Sulfonate | 25-50 |
| Na Pentadecylbromodiphenyl Oxide Sulfonate | 25-50 |
| Na Dodecyliododiphenyl Oxide Sulfonate | 25-50 |
| Na Docosanylchlorodiphenyl Oxide Disulfonate | 50-100 |

In other tests similar to those reported in Table II, the ability of the compounds of the invention to inhibit the growth of other microorganisms was measured. The procedure was the same as that described above except that in the case of *Corynebacterium diphtheriae* the culture medium was a brain-heart infusion broth and the cultures of *Bacillus subtilis* and *Bacillus cereus* were incubated 10 days before being read.

Results of these tests are shown in the following table.

Sodium dodecylchlorodiphenyl oxide sulfonate was the growth inhibitor in each of these experiments.

TABLE III

*Inhibition of growth of various microorganisms*

| Organism | Inhibitory Concentration, p.p.m. |
|---|---|
| *Bacillus subtilis* | 10-25 |
| *Bacillus cereus* | 10-25 |
| *Corynebacterium diphtheriae* | 5-10 |
| *Micrococcus pyogenes* var. aureus #209 | 2.5-5 |
| *Micrococcus pyogenes* var. aureus 80/81 | 5-10 |
| *Micrococcus pyogenes* var. albus | 5-10 |
| *Micrococcus pyogenes* var. aureus Queens General Hospital | 5-10 |
| *Streptococcus viridans* | 10-25 |
| Hemolytic Streptococcus | 5-10 |

It has been found that the alkali metal salts and other pharmaceutically acceptable salts of the sulfonic acids of the invention are substantially non-irritating to animal tissues and non-toxic when used internally or externally in antimicrobial concentrations. This makes them highly desirable as active components of household detergents, toilet soaps and detergent bars, shampoos, cosmetic creams, lotions, powders and the like, foot powders, body dusting powders, ointments, salves, pharmaceutical creams and injectable antibiotics. Some of these applications are illustrated by the following examples.

EXAMPLE 2

A typical laundry detergent having antimicrobial properties:

| | Parts |
|---|---|
| Sodium dodecylchlorodiphenyl oxide sulfonate | 20 |
| Sodium tripolyphosphate | 50 |
| Sodium carboxymethyl cellulose | 0.5 |

The above composition is highly effective at a concentration of 0.10 to .15% in hard or soft water. It not only cleans fabrics but imparts antimicrobial properties thereto.

While the water-soluble salts of the invention are effective surfactants in themselves., they are also effective when combined with other anionic or nonionic detergents. This compatibility is especially useful in the formulation of detergent bars for hand and bath use. A typical such bar having outstanding detergent and antimicrobial properties is described in the following example.

EXAMPLE 3

2400 grams (20.2% by weight) of sodium dodecylchlorodiphenyl oxide sulfonate, 5065 grams (61.7%) of the coconut acid ester of sodium isethionate (Igepon AC 78, a product of General Dyestuff Corporation), 640 grams (7.7%), of zinc stearate and 80 grams (.9%) of titanium dioxide were mixed together and passed twice through a 3-roll mill to obtain a smooth ribbon. The ribbon was then passed through a soap plodder several times to insure uniform mixing and then plodded into a long rod which was then cut and pressed into bars about 1 inch thick and 3 inches square. The bar was then employed in the treatment of fungus diseases such as athlete's foot (*Tinea pedis*) by washing the affected area with the bar twice daily for a period of 3 weeks. At the end of this period, marked relief of the fungus growth was observed as evidenced by healing of the scale and raw area of the affected portions. A control was run employing a composition substantially identical with the above except that no diphenyl oxide derivative was present. Washing the affected area with the control for a period of 3 weeks resulted in no improvement or relief.

EXAMPLE 4

750 grams (22.8%) of sodium dodecylchlorodiphenyl oxide sulfonate, 2250 grams (68.2%) of Ivory Soap Flakes (a commercial product of Procter & Gamble Company), and 300 grams (9.0%) of water were milled, plodded and pressed into bars in the manner of Example 3. This soap was excellent as a hand or bath soap, having a desirable hardness, feel and rate of dissolving. It produced abundant lather having excellent cleaning.

The bars were employed to treat athlete's foot by washing the affected area. Within 3 weeks relief of rawness and itching was evidenced. Controls wherein the affected areas were similarly washed with a bar of Ivory soap showed no relief.

EXAMPLE 5

The following ointment composition was employed for the treatment of athlete's foot with considerable relief being evidenced by healing of the raw areas and cessation of itching and irritation:

| | Grams |
|---|---|
| Stearic acid | 384 |
| Cetyl alcohol | 48 |
| Olive Oil | 96 |
| Lanolin | 24 |
| Dodecylchlorodiphenyl oxide sulfonate | 48 |
| β-Phenylethyl alcohol | 2.4 |
| Propylene glycol | 24 |
| Triethanolamine | 24 |
| Water | 1749.6 |

The compounds of the invention, when used in soaps, ointments, dusting powders or lotions, have shown a beneficial soothing effect and reduction or elimination of itching or irritation in various other skin disorders, such as diaper rash and dandruff and on flea bites and fungus infections on dogs.

EXAMPLE 6

Sodium dodecylchlorodiphenyl oxide sulfonate was tested as a fungicide on apple trees. When applied as a spray, an aqueous solution containing 0.5 lb. per 100 gallons it was found that the incidence of scab was reduced from 6 lesions per 100 leaves in the control to 5.3 lesions per 100 leaves. When the concentration of the spray was increased to 2 lb. per 100 gallons the number of lesions was reduced to 2.5 per 100 leaves.

The symbol M is used herein to represent a cation. It is to be understood that wherever M is used, the cation is present in sufficient quantity to satisfy the valence of the sulfonate radical with which it is associated. Thus, in the radical —SO$_3$M, it is to be understood that M represents 1 molar proportion of a mono-valent cation, ½ molar proportion of a divalent cation or ⅓ molar proportion of a trivalent cation.

We claim:

1. A method for imparting antimicrobial properties to a surface comprising applying to said surface an antimicrobially effective amount of a compound having the formula

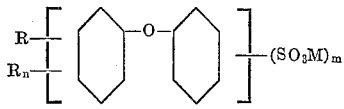

wherein R is alkyl containing 12 to 22 carbon atoms; X is a halogen having an atomic number from 17 to 53; $m$ and $n$ are integers from 1 to 2; and, M is a cation.

2. A method as defined in claim 1 wherein the surface is that of a living organism.

3. A method as defined in claim 1 wherein the surface is that of a fabric.

4. A method as defined in claim 1 wherein the compound is applied to the surface in combination with an aqueous carrier.

5. A method as defined in claim 1 wherein the compound is applied to the surface in the form of a solution in an inert nonaqueous solvent.

6. A method for the treatment of external fungus infections in animals comprising applying to the affected area a fungistatic amount of a compound having the formula

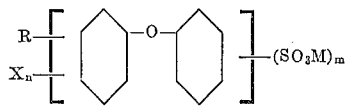

wherein R is alkyl containing 12 to 22 carbon atoms; X is a halogen having an atomic number from 17 to 53; $m$ and $n$ are integers from 1 to 2; and, M is a cation.

7. A composition comprising a pharmaceutically acceptable ointment base and, as an active antimicrobial component, an effective amount of the compound defined in claim 6.

8. A composition comprising a pharmaceutically acceptable ointment base and, as an active antimicrobial ingredient, an effective concentration of sodium dodecylchlorodiphenyl oxide sulfonate.

References Cited by the Examiner

UNITED STATES PATENTS

| 2,081,876 | 5/1937 | Prahl | 252—161 |
| 2,854,477 | 9/1958 | Steinhauer | 252—161 |

JULIAN S. LEVITT, *Primary Examiner.*

GEORGE A. MENTIS, *Assistant Examiner.*

UNITED STATES PATENT OFFICE
CERTIFICATE OF CORRECTION

Patent No. 3,252,856                                              May 24, 1966

Alfred F. Steinhauer et al.

It is hereby certified that error appears in the above numbered patent requiring correction and that the said Letters Patent should read as corrected below.

Column 2, line 48, for "desidual" read -- residual --; column 5, lines 43 to 46, for that portion of the formula reading "$R_n$——" read -- $X_n$—— --.

Signed and sealed this 1st day of August 1967.

(SEAL)
Attest:

Edward M. Fletcher, Jr.                                         EDWARD J. BRENNER
Attesting Officer                                                   Commissioner of Patents